(12) United States Patent
Wang

(10) Patent No.: US 10,171,804 B1
(45) Date of Patent: Jan. 1, 2019

(54) VIDEO FRAME ENCODING SCHEME SELECTION

(71) Applicant: Google Inc., Mountain View, CA (US)

(72) Inventor: Zhonglei Wang, Fremont, CA (US)

(73) Assignee: GOOGLE LLC, Mountain View, CA (US)

(*) Notice: Subject to any disclaimer, the term of this patent is extended or adjusted under 35 U.S.C. 154(b) by 892 days.

(21) Appl. No.: 13/773,106

(22) Filed: Feb. 21, 2013

(51) Int. Cl.
*H04N 19/176* (2014.01)
*H04N 19/127* (2014.01)

(52) U.S. Cl.
CPC .......................... *H04N 19/00103* (2013.01)

(58) Field of Classification Search
None
See application file for complete search history.

(56) References Cited

U.S. PATENT DOCUMENTS

| | | | |
|---|---|---|---|
| 6,782,135 B1 | 8/2004 | Viscito et al. | |
| 8,031,769 B2 | 10/2011 | Kuo | |
| 8,279,925 B2 | 10/2012 | Sathianathan et al. | |
| 8,804,508 B1* | 8/2014 | Hobbs | 370/230 |
| 2002/0090027 A1* | 7/2002 | Karczewicz et al. | 375/240.01 |
| 2002/0163966 A1* | 11/2002 | Ramaswamy | 375/240.03 |
| 2005/0084009 A1* | 4/2005 | Furukawa et al. | 375/240.03 |
| 2005/0169379 A1* | 8/2005 | Shin et al. | 375/240.16 |
| 2007/0071097 A1* | 3/2007 | Koto | H04N 19/149 375/240.12 |
| 2007/0116126 A1* | 5/2007 | Haskell et al. | 375/240.21 |
| 2007/0263720 A1* | 11/2007 | He | 375/240.03 |
| 2008/0062018 A1* | 3/2008 | Normile | H04N 19/156 341/50 |
| 2008/0107185 A1* | 5/2008 | Lefol et al. | 375/240.25 |
| 2010/0054618 A1* | 3/2010 | Kawazoe | H04N 19/46 382/239 |
| 2011/0080950 A1* | 4/2011 | Toyota | H04N 21/23805 375/240.12 |
| 2011/0211637 A1* | 9/2011 | Blum | H04N 19/147 375/240.16 |
| 2014/0119431 A1* | 5/2014 | Chihara | H04N 19/56 375/240.02 |
| 2014/0177701 A1* | 6/2014 | Golikeri | H04N 19/176 375/240.02 |

FOREIGN PATENT DOCUMENTS

WO 2009158113 A2 12/2009

OTHER PUBLICATIONS

Bankoski, et al, "Technical Overview of VP8, An Open Source Video Codec for the Web", 2011 IEEE International Conference on Multimedia and Expo (ICME), Jul. 2011, 6 page.

* cited by examiner

*Primary Examiner* — Anand S Rao
*Assistant Examiner* — Samuel D Fereja
(74) *Attorney, Agent, or Firm* — Brake Hughes Bellermann LLP

(57) ABSTRACT

Disclosed is a method, a system and a computer readable medium for encoding a video stream. The method includes determining a first time period based on a first estimated processing time algorithm, determining a second time period based on a second estimated processing time algorithm, comparing an encoding time period of the video frame to the first time period and the second period, and changing an encoding scheme for encoding a subsequent video frame if two times the encoding time of the video frame is one of less than the first time period and greater than the second time period.

23 Claims, 8 Drawing Sheets

400

| Configuration index /405 | Encoding Scheme /410 | Estimated Processing Time /415 | Sample Data /420 |
|---|---|---|---|
| E[15] | loop filter[on] ... | T15 | 200 ms |
| ............ | ............ | ............ | ............ |
| E[3] | loop filter[on] ... | T3 | 27 ms |
| E[2] | loop filter[off] ... | T2 | 20 ms |
| E[1] | loop filter[off] ... | T1 | 12 ms |
| E[0] | loop filter[off] ... | T0 | 10 ms |

| Key /455 | Configuration index /460 | Processing Time /465 |
|---|---|---|
| 0 | E[1] | 12.5 ms |
| ............ | ............ | ............ |
| 100 | E[1] | 11.8 ms |
| 101 | E[0] | 9.8 ms |

FIG. 4B

VIDEO FRAME ENCODING SCHEME SELECTION

FIELD

Embodiments relate to video frame encoding scheme selection based on real time utilization of shared system resources.

BACKGROUND

In mobile devices, frame rate for video transmissions is a critical factor affecting user experience for real time communications. However, computing capability constraints and mobility of the mobile device may affect the mobile device such that the mobile device cannot process a video frame in time to achieve a consistent and high frame rate. Video delay, jerky video and audio video out of sync may result from the mobile device not being able to process the video frame in time.

For example, in some systems, in order to achieve 15 fps frame rate, video encoding and video decoding should be finished in approximately 66 ms. The video encoder processing time can be dependent on input raw image and system resource utilization (e.g., processor use). For example, typical variation in video encoding time can be in the range of T/2 to 2T, where T is average video encoding time. When a system utilization spike occurs (e.g., a processor use spike), the spike may result in problems (e.g., frame rate reduction) with video encoding negatively affecting user experience.

SUMMARY

One embodiment includes a method for encoding a video stream, the method includes determining a first time period based on a first estimated processing time algorithm, determining a second time period based on a second estimated processing time algorithm, comparing an encoding time period of the video frame to the first time period and the second period, and changing an encoding scheme for encoding a subsequent video frame if two times the encoding time of the video frame is one of less than the first time period and greater than the second time period.

Another embodiment includes a method for encoding a video stream, the method includes generating a data table including a plurality of video encoding schemes and associated estimated times for encoding a video frame using each of the video encoding schemes, indexing the data table such that an index value of zero includes an estimated processing time for encoding a video frame is associated with a lowest time value and each subsequent index value is associated with a subsequent lowest time value, selecting a first index value, encoding a first video frame using a video encoding schemes selected from the data table using the first index value, determining a first time period based on a first estimated processing time algorithm, determining a second time period based on a second estimated processing time algorithm, comparing an encoding time of the first video frame to the first time period and the second, and selecting a second index value for use in encoding a second video frame if two times the encoding time of the video frame is one of less than the first time period and greater than the second time period.

Still another embodiment includes an encoding system including a processor, a memory configured to store a data table, the data table including a plurality of video encoding schemes and corresponding estimated processing times, a controller configured to select one of the video encoding schemes for encoding a subsequent video frame based on an estimated processing time period for encoding a current video frame and an elapsed time period for encoding the current video frame, and a video encoder configured to encode the subsequent video frame using the selected video encoding scheme.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein:

FIG. 4A illustrates a data table according to at least one example embodiment.

FIG. 4B illustrates a data table according to at least one example embodiment.

Figure 1A:
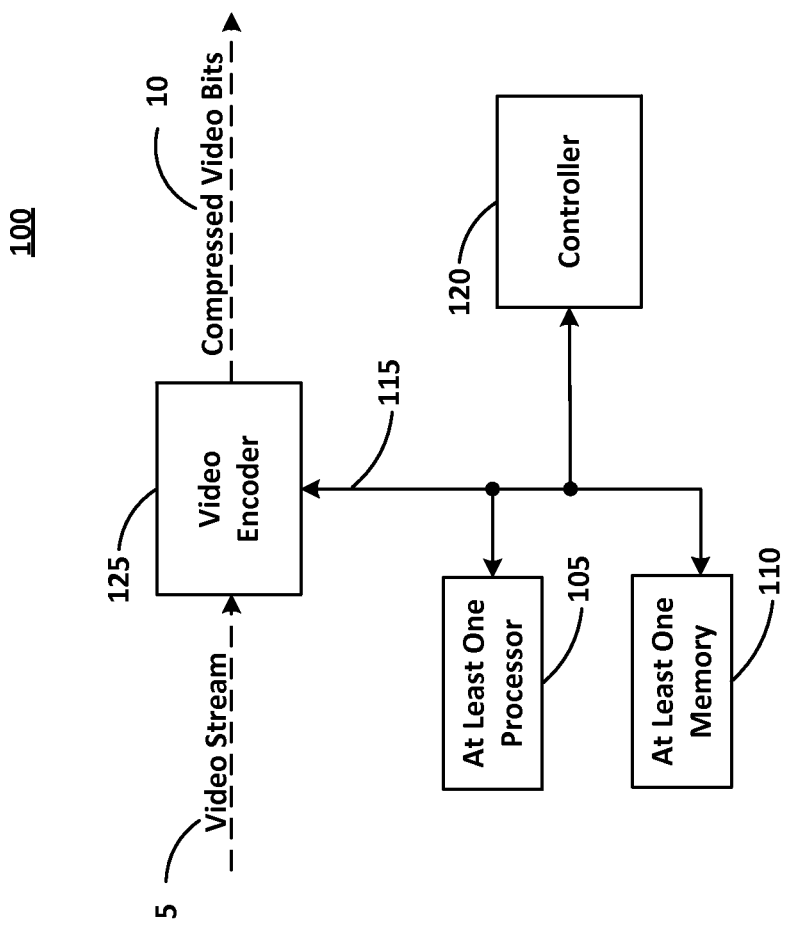
FIG. 1A illustrates a video encoder system according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of modules, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

System resource utilization (e.g., processor use) of a video encoder may be varied based on the image resolution, frame rate, bit rate, motion behavior image texture complexity and other factors and/or parameters of the video encoder. Given a set image resolution, frame rate and bit rate, system resource utilization (e.g., processor use) may be affected by motion estimation, motion search window size etc.

In an electronic device, a video encoder may typically share system resources with other applications and services. In addition, the system resources that may be allocated to video encoder also affects system resource utilization (e.g., processor use) of the video encoder. In a real time video conference system, system resource utilization may not be predictable. For example, system resource utilization may vary based on the raw input image. Typically, a motion video sequence may increase system resource utilization of motion estimation, thus causing a system resource utilization spike (e.g., a processor usage spike).

In example embodiments, a current video frame may be the video frame being encoded. A previous video frame may be at least one video frame having been processed (e.g., encoded) earlier in time as compared to the current video frame. A subsequent video frame may be at least one video frame to be processes later in time as compared to the current video frame. Example embodiments provide a method and apparatus for detecting system resource utilization in a current video frame and adjusting system resource utilization in a subsequent video frame based on the system resource utilization in the current video frame. Example embodiments may pre-define configurations for the video encoder (e.g., store in a table), and for each video encoder configuration, the system resource utilization may be estimated (e.g., by estimating an elapsed time for encoding in each configuration). By comparing the estimated system resource utilization and real time system resource utilization (e.g., encoding process time), a delta in system resource utilization can be detected. As a result, video encoder configuration may be changed accordingly to meet real time requirements.

In the example of FIG. 1A, a video encoder system 100 may be at least one computing device and should be understood to represent virtually any computing device configured to perform the methods described herein. As such, the video encoder system 100 may be understood to include various standard components which may be utilized to implement the techniques described herein, or different or future versions thereof. By way of example, the video encoder system 100 is illustrated as including at least one processor 105, as well as at least one memory 110 (e.g., a computer readable storage medium).

Thus, as may be appreciated, the at least one processor 105 may be utilized to execute instructions stored on the at least one memory 110, so as to thereby implement the various features and functions described herein, or additional or alternative features and functions. Of course, the at least one processor 105 and the at least one memory 110 may be utilized for various other purposes. In particular, it may be appreciated the at least one memory 110 may be understood to represent an example of various types of memory and related hardware and software which might be used to implement any one of the modules described herein.

FIG. 1A illustrates the video encoder system according to at least one example embodiment. As shown in FIG. 1A, the video encoder system 100 includes the at least one processor 105, the at least one memory 110, a controller 120, and a video encoder 125. The at least one processor 105, the at least one memory 110, the controller 120, and the video encoder 125 are communicatively coupled via bus 115.

The at least one processor 105 may be configured to execute computer instructions associated with the controller 120 and/or the video encoder 125. The at least one processor 105 may be a shared resource. For example, the video encoder system 100 may be an element of a larger system (e.g., a mobile device). Therefore, the at least one processor 105 may be configured to execute computer instructions associated with other elements (e.g., web browsing or wireless communication) within the larger system.

The at least one memory 110 may be configured to store data and/or information associated with the video encoder system 100. For example, the at least one memory 110 may be configured to store data tables including, for example, data tables storing selectable video encoding schemes for use by the video encoder 125 to encode video frames. For example, the at least one memory 110 may be configured to store data tables including, for example, data tables storing historical data associated with encoding video frames. The at least one memory 110 may be a shared resource. For example, the video encoder system 100 may be an element of a larger system (e.g., mobile device). Therefore, the at least one memory 110 may be configured to store data and/or information associated with other elements (e.g., web browsing or wireless communication) within the larger system.

The controller 120 may be configured to generate various control signals and communicate the control signals to various blocks in video encoder system 100. The controller 120 may be configured to generate the control signals in accordance with the methods described below. The controller 120 may be configured to control the video encoder 125 to encode a video frame according to example embodiments. For example, the controller 120 may generate control signals corresponding to a target video encoding scheme. Each video encoding scheme may include an associated estimated elapsed video processing time for which the video encoder 125 expects video encoding to be finished (e.g., an average processing time on an electronic device) based on a combination of settings.

For example, controller 120 may be configured to generate control signals including a video encoding scheme corresponding to settings associated with the size of motion search window, rate distortion, sub pixel motion, loop filter options, motion search modes, thresholds for vertical and horizontal prediction, thresholds for multiple motion vectors, and the like as input control signals for the video encoder 125. As discussed below (see FIG. 3), the settings may be associated with various blocks of the video encoder 125. The controller 120 may select the video encoding scheme from a data table (e.g., the data table 400 described below with regards to FIG. 4A) stored in the at least one memory 110.

The video encoder 125 may be configured to receive a video stream input 5 and output compressed (e.g., encoded) video bits 10. The video encoder 125 may convert the video stream input 5 into discrete video frames. The video encoder 125 may further convert each discrete video frame into a matrix of blocks (hereinafter referred to as blocks). For example, a video frame may be converted to a 16×16, a 16×8, an 8×8 or a 4×4 matrix of blocks each having a number of pixels. Although four example matrices are listed, example embodiments are not limited thereto.

The video encoder 125 may be configured to encode the video frame based on a video encoding scheme received from the controller 120. For example, the video encoding scheme may correspond to settings associated with the video encoder 125. The settings may be associated with the size of motion search window, rate distortion, sub pixel motion, loop filter options, motion search modes, thresholds for vertical and horizontal prediction, thresholds for multiple motion vectors, and the like. The video encoding scheme utilized by the video encoder 125 may affect an amount of time (e.g., elapsed time) for the video encoder 125 to encode the video frame. For example, adding complexity to the video encoding scheme may increase the time (e.g., elapsed time) for the video encoder 125 to encode the video frame.

The video encoder 125 may an associated encoding priority. The encoding priority may set an amount of system resources (e.g., an amount of at least one processor 105 processing time and/or an amount of at least one memory assigned) allocated to the video encoder 125. A high encoding priority may result in a faster encoding of the video frame as compared to a low encoding priority because a high encoding priority may be less likely to be interrupted by other processes The encoding priority may be a numeric value (e.g. a number between 1 and 10). The encoding priority may be a text value (e.g., low, medium, high). The encoding priority may rank the encoding process as compared to other processes (e.g., threads) performed by the device. For example, a higher encoding priority may be executed before another process having a lower priority. For example, a video frame being encoded with an encoding priority of 3 may be processed before another process having a priority of 6 and after another process having a priority of 2. The another process may be another video encoding process, an audio encoding process, a word processing application process and the like.

The compressed video bits 10 may represent the output of the video encoder system 100. For example, the compressed video bits 10 may represent an encoded video frame. For example, the compressed video bits 10 may be ready for transmission to a receiving device (not shown). For example, the video bits may be transmitted to a system transceiver (not shown) for transmission to the receiving device.

According to example embodiments, the controller 120 may select each scheme includes an estimated video processing time for which the video encoder expects video encoding to be finished (e.g., an average processing time on an electronic device) based on a combination of these settings.

Figure 1B:
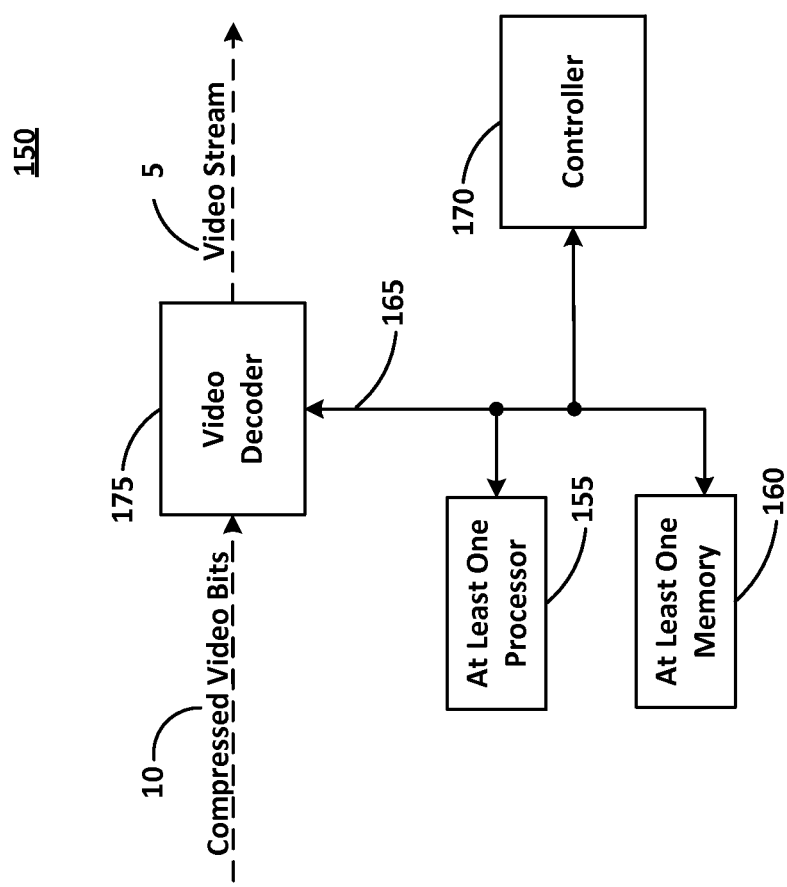
FIG. 1B illustrates a video decoder system according to at least one example embodiment.

In the example of FIG. 1B, a video decoder system 150 may be at least one computing device and should be understood to represent virtually any computing device configured to perform the methods described herein. As such, the video decoder system 150 may be understood to include various standard components which may be utilized to implement the techniques described herein, or different or future versions thereof. By way of example, the video decoder system 150 is illustrated as including at least one processor 155, as well as at least one memory 160 (e.g., a computer readable storage medium).

Thus, as may be appreciated, the at least one processor 155 may be utilized to execute instructions stored on the at least one memory 160, so as to thereby implement the various features and functions described herein, or additional or alternative features and functions. Of course, the at least one processor 155 and the at least one memory 160 may be utilized for various other purposes. In particular, it may be appreciated the at least one memory 160 may be understood to represent an example of various types of memory and related hardware and software which might be used to implement any one of the modules described herein. According to example embodiments, the video encoder system 100 and the video decoder system 150 may be included in a same larger system (e.g., a mobile device).

FIG. 1A illustrates the video encoder system according to at least one example embodiment. As shown in FIG. 1A, the video encoder system 100 includes the at least one processor 105, the at least one memory 110, a controller 120, and a video encoder 125. The at least one processor 105, the at least one memory 110, the controller 120, and the video encoder 125 are communicatively coupled via bus 115. According to example embodiments, the video encoder system 100 and the video decoder system 150 may be included in a same larger system (e.g., a mobile device). As such, the at least one processor 155 and the at least one processor 105 may be a same the at least one processor. Further, the at least one memory 160 and the at least one memory 110 may be a same at least one memory. Still further, the controller 170 and the controller 120 may be a same controller.

The at least one processor 155 may be configured to execute computer instructions associated with the controller 170 and/or the video decoder 175. The at least one processor 155 may be a shared resource. For example, the video decoder system 150 may be an element of a larger system (e.g., a mobile device). Therefore, the at least one processor 155 may be configured to execute computer instructions associated with other elements (e.g., web browsing or wireless communication) within the larger system.

The at least one memory 160 may be configured to store data and/or information associated with the video decoder system 150. For example, the at least one memory 160 may be configured to store data tables including, for example, data tables storing selectable video encoding schemes for use by the video decoder 175 to decode video frames. For example, the at least one memory 170 may be configured to store data tables including, for example, data tables storing historical data associated with decoding video frames. The at least one memory 160 may be a shared resource. For example, the video decoder system 150 may be an element of a larger system (e.g., mobile device). Therefore, the at least one memory 160 may be configured to store data and/or information associated with other elements (e.g., web browsing or wireless communication) within the larger system.

The controller 170 may be configured to generate various control signals and communicate the control signals to various blocks in video decoder system 150. The controller 170 may be configured to generate the control signals similar to the video encoding methods described below. The controller 170 may be configured to control the video decoder 175 to decode a video frame according to example embodiments. For example, the controller 170 may generate control signals corresponding to a target video encoding scheme. Each video encoding scheme may include an associated estimated elapsed video processing time for which the video encoder 125 expects video encoding to be finished (e.g., an average processing time on an electronic device) based on a combination of settings.

For example, controller 170 may be configured to generate control signals including a video encoding scheme corresponding to settings associated with the size of motion search window, rate distortion, sub pixel motion, loop filter options, motion search modes, thresholds for vertical and horizontal prediction, thresholds for multiple motion vectors, and the like as input control signals for the video decoder 175. As discussed below (see FIG. 3), the settings may be associated with various blocks of the video encoder 125 (noting that the video decoder 175 performs the inverse function of the video encoder 125). The controller 170 may select the video encoding scheme from a data table (e.g., the data table 400 described below with regards to FIG. 4A) stored in the at least one memory 160 based on information received from a system that performed the video encoding (e.g., video encoder system 100).

The video decoder 175 may be configured to receive a compressed (e.g., encoded) video bits 10 input and output a video stream 5. The video decoder 175 may convert discrete video frames of the compressed video bits 10 into the video stream 5.

The video decoder 175 may be configured to decode the video frame based on a video encoding scheme received from the controller 170. For example, the video encoding scheme may correspond to settings associated with the video decoder 175. The settings may be associated with the size of motion search window, rate distortion, sub pixel motion, loop filter options, motion search modes, thresholds for vertical and horizontal prediction, thresholds for multiple motion vectors, and the like.

Figure 2:
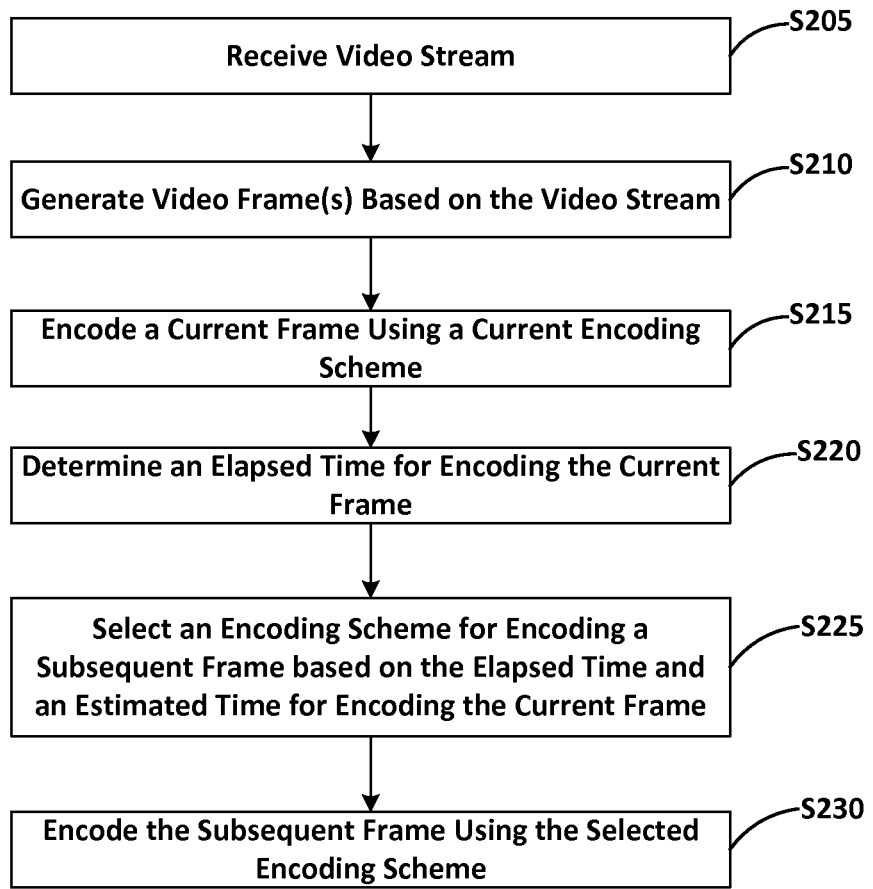
FIG. 2 illustrates a method for encoding a video frame according to at least one example embodiment.

FIG. 2 illustrates a method for encoding a video frame according to at least one example embodiment. The method steps described with regard to FIG. 2 may be executed as software code stored in a memory (e.g., at least one memory 110) associated with a video encoder system (e.g., as shown in FIG. 1A) and executed by at least one processor (e.g., processor 105) associated with the video encoder system. However, alternative embodiments are contemplated such as a video encoder embodied as a special purpose processor.

For example, the method steps may be performed by an application-specific integrated circuit, or ASIC. For example, the ASIC may be configured as the video encoder 125 and/or the controller 120. Although the steps described below are described as being executed by a processor, the steps are not necessarily executed by a same processor. In other words, at least one processor may execute the steps described below with regard to FIG. 2.

As shown in FIG. 2, in step S205 a video encoder (e.g., video encoder 125) receives a video stream (e.g., video stream 5). For example, the video stream may be a real time video stream (e.g., a video conference or a video chat). For example, the video stream may be a previously recorded video (e.g., a movie or a video recorder recording).

In step S210, the video encoder generates at least one video frame based on the video stream. For example, the processor may convert the video stream input 5 into discrete video frames. The video encoder may further convert each discrete video frame into a matrix of blocks (hereinafter referred to as blocks). For example, a video frame may be converted to a 16×16, a 16×8, an 8×8 or a 4×4 matrix of blocks each having a number of pixels. Although three example matrices are listed, example embodiments are not limited thereto.

In step S215, the video encoder encodes a current video frame using a current video encoding scheme. For example, the video encoder may transform and quantize the current video frame. For example, transforming the current video frame may include converting the values of pixels from the spatial domain to transform coefficients in a transform domain. For example, quantizing the current video may include reducing data in each transformation coefficient.

The video encoding scheme may include one or more settings utilized by the video encoder for transforming and/or quantizing the current video frame. The one or more settings may affect an amount of time the video encoder takes when transforming and/or quantizing the current video frame.

In step S220, a controller (e.g., controller 120) determines an elapsed time for encoding the current video frame. For example, the controller may utilize a system clock to determine an amount of time that elapses from initiation of the encoding of the current video frame to the completion of the encoding of the current video frame. This elapsed time may be stored in a data table. For example, the elapsed time may be stored in a data table (e.g., the data table 450 described below with regard to FIG. 4B) associated with the at least one memory 110.

In step S225, the controller selects a video encoding scheme for encoding a subsequent video frame based on the elapsed time and an estimated time for encoding the current video frame. For example, if the elapsed time is greater than (or outside a target range that is greater than) the estimated time, the controller may select a video encoding scheme for encoding the subsequent video frame that results in faster video encoding. For example, if the elapsed time is less than (or outside a target range that is less than) the estimated time, the controller may select a video encoding scheme for encoding the subsequent video frame that results in slower video encoding. For example, if the elapsed time is approximately equal to the estimated time, the controller may select a same video encoding scheme for the subsequent video frame as was used in encoding the current video frame.

The video encoding scheme may be stored in association with the estimated time for encoding a video frame in a data table associated with the at least one memory 110. For example, the data table may be the data table 400 described below with regard to FIG. 4A. For example, the controller may select the video encoding scheme from the data table based on, for example, a target estimated time for encoding a video frame.

In step S230, the video encoder encodes the subsequent video frame using the selected video encoding scheme. For example, the video encoder may transform and quantize the subsequent video frame. For example, transforming the subsequent video frame may include converting the values of pixels from the spatial domain to transform coefficients in a transform domain. For example, quantizing the subsequent video may include reducing data in each transformation coefficient.

The selected video encoding scheme may include one or more settings utilized by the video encoder for transforming and/or quantizing the subsequent video frame. The one or more settings may affect an amount of time the video encoder takes when transforming and/or quantizing the current video frame. The selected video encoding scheme may be communicated to the video encoder (e.g., video encoder 125) from the controller (e.g., controller 120) via a data/signal bus (e.g., bus 115).

Figure 3:
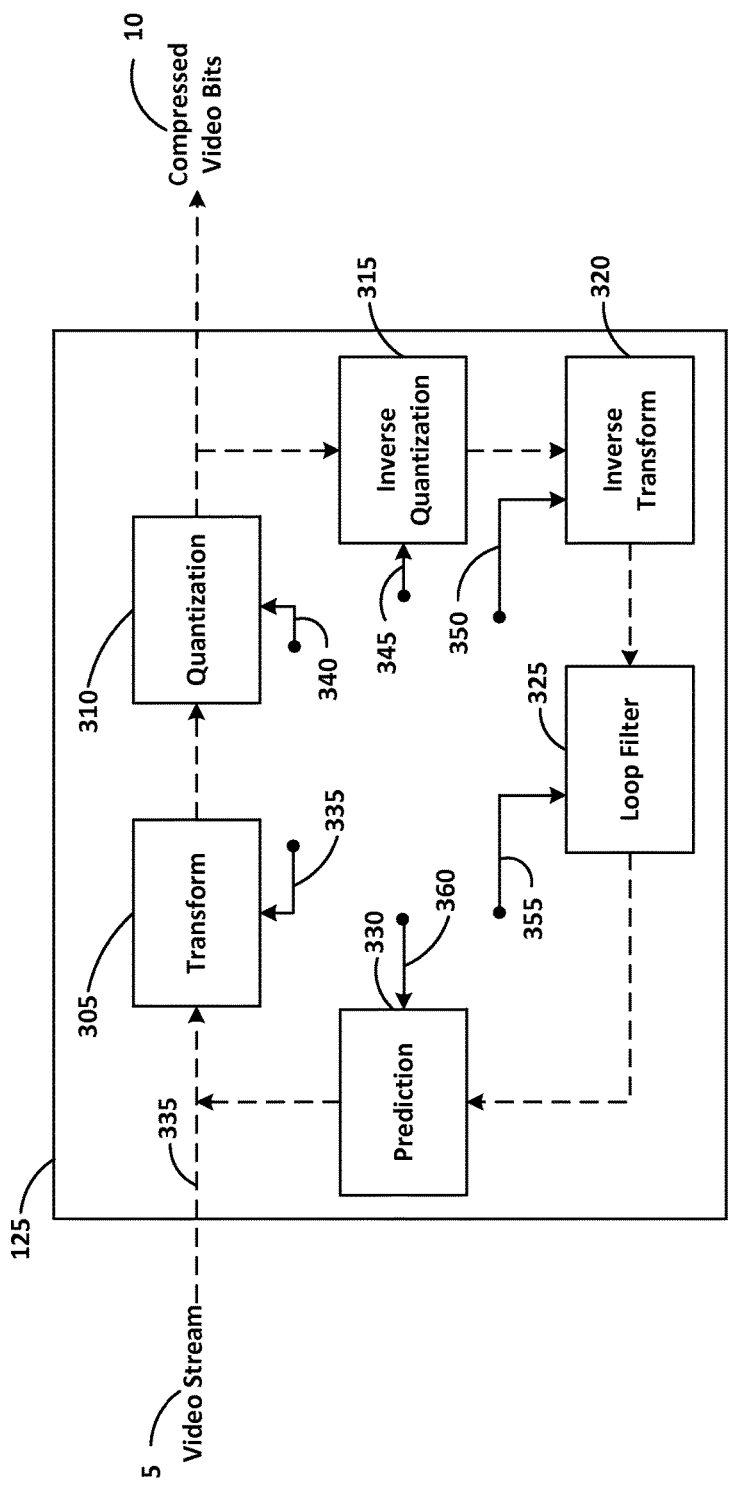
FIG. 3 illustrates a flow diagram for a video encoder system according to at least one example embodiment.

FIG. 3 illustrates the video encoder 125 according to at least one example embodiment. As shown in FIG. 1A the video encoder 125 includes a transform block 305, a quantization block 310, an inverse quantization block 315, an inverse transform block 320, a loop filter block 325, and a prediction block 330. As shown in FIG. 1A, dashed lines represent data flow 335 (e.g., video data in various forms) amongst the several blocks and solid lines represent control signal flows 340 between several blocks and the controller 120.

Each of the aforementioned blocks may be executed as software code stored in a memory (e.g., at least one memory 110) associated with a video encoder system (e.g., as shown in FIG. 1A) and executed by at least one processor (e.g., at least one processor 105) associated with the video encoder system. However, alternative embodiments are contemplated such as a video encoder embodied as a special purpose processor. For example, each of the aforementioned blocks (alone and/or in combination) may be an application-specific integrated circuit, or ASIC. For example, the ASIC may be configured as the transform block 305 and/or the quantization block 310.

As shown in FIG. 3, each of the aforementioned blocks may include a corresponding input control signal 335, 340, 345, 350, 355, and 360. The control signals may be received from controller 120 via bus 115.

The transform block 305 may be configured to convert the values of the pixels from the spatial domain to transform coefficients in a transform domain. The transform coefficients may correspond to a two-dimensional matrix of coefficients that is ordinarily the same size as the original block. In other words, there may be as many transform coefficients as pixels in the original block. However, due to the transform, a portion of the transform coefficients may have values equal to zero.

The transform block 305 may be configured to perform entropy encoding. The entropy encoding may be achieved with hybrid transformation. The hybrid transformation may include, for example, discrete cosine transformation and/or Walsh-Hadamard transformation. The discrete cosine transformation may transform each block into spectral components using a known two dimensional to discrete cosine transformation matrix. The Walsh-Hadamard transformation may transform each block using a known normalized Walsh-Hadamard transformation matrix. The transform block 305 may be configured to receive the control signal 335 from the controller 120. The control signal 335 may include a parameter indicating the type of encoding (e.g., entropy, discrete cosine transformation and/or Walsh-Hadamard transformation) the transform block 305 is to use. The control signal 335 may include a parameter indicating rate distortion as either on or off.

The quantization block 310 may be configured to reduce the data in each transformation coefficient. Quantization may involve mapping values within a relatively large range to values in a relatively small range, thus reducing the amount of data needed to represent the quantized transform coefficients. The quantization block 310 may modify the degree of quantization applied to the transform coefficient values by adjusting one or more parameters. For example, the control signal 340 may include the one or more parameters associated with modifying the degree of applied quantization.

For example, the quantization block 310 may be configured to add zeros to the data associated with a transformation coefficient. For example, an encoding standard may define 128 quantization levels in a scalar quantization process. For each video frame, the encoding standard may allow different quantization levels to be used for six frequency components (e.g., 1st order luma DC, 1st order luma AC, 2nd order luma DC, 2nd order luma AC, chroma DC and chroma AC). In addition, the encoding standard design may include a region adaptive quantization scheme, in which the bitstream provides the capability of classifying macroblocks within a video frame into, for example, four different segments, with each segment having a quantization parameter set. For example, the control signal 340 may include the one or more parameters associated with the six frequency components.

According to example embodiments, quantization block 310 may be configured to set luma DC, luma AC, chroma DC, and so forth, separately. The higher the number of frequency components that are set for each video frame, the more processing time required to quantize (and therefore encode) each video frame. Conversely, the fewer the number of frequency components that are set for each video frame, the less processing time required to quantize (and therefore encode) each video frame. The quantization block 310 may be configured to receive the control signal 340 from the controller 120. The control signal 340 may include a parameter indicating the settings for luma DC, luma AC, chroma DC, and so forth. The control signal 340 may include a parameter indicating rate distortion as either on or off.

The inverse quantization block 315 and the inverse transform block 320 may be configured to perform inverse quantization and inverse transformation, respectively, to reconstruct the block in the pixel domain, e.g., for later use as a reference block. The inverse quantization block 315 may be configured to receive a control signal 345 from the controller 120. The control signal 345 may include a parameter indicating the settings for luma DC, luma AC, chroma DC, and so forth for use in the inverse quantization. The inverse transform block 320 may be configured to receive a control signal 350 from the controller 120. The control signal 350 may include a parameter indicating the type of encoding used by the transform block 305.

The loop filter block 325 may be configured to remove blocking artifacts introduced by quantization of coefficients from block transforms. For example, blocking artifacts may be removed by applying different loop filter strengths to different parts of the image, according to the prediction modes or reference frames used to encode each macroblock. For example, applying stronger filtering to intra-coded blocks (discussed below) and at the same time specify that inter-coded blocks (discussed below) that use the Golden Frame as a reference may use a weaker filter. The choice of loop filter strengths in a variety of situations may be adjustable on a frame-by-frame basis, so the video encoder may adapt the filtering strategy in order to get the best possible results. The loop filter block 325 may be configured to receive a control signal 355 from the controller 120. The control signal 355 may include a parameter indicating loop filter options (e.g., the filter strength and type).

The prediction block 330 may be configured to take advantage of video frame coherence (e.g., pixels that have not changed from one video frame to another). For example, previously coded blocks within a current video frame may be utilized in a subsequent video frame. Prediction may include two types. For example, prediction may include intra-frame prediction and inter-frame prediction. Intra-frame prediction relates to predicting the pixel values in a block of a picture relative to reference samples in neighboring, previously coded blocks of the same picture. Inter-frame prediction relates to predicting the pixel values in a block of a picture relative to data of a previously coded picture.

Intra-frame prediction may include a chroma type and a Luma type. The chroma type may include four modes. For example, the chroma type may include a horizontal prediction mode, a vertical prediction mode, a DC prediction mode, and a motion prediction mode. The horizontal prediction mode may fill each pixel column with a copy of a left neighboring column. The vertical prediction mode may fill each pixel column with a copy of a row above. The DC prediction mode may fill each block with a single value. The single value may be an average of the pixels to the left and above the block. The motion prediction mode may fill each block with a single value. The single value may be an algorithm based on an above row, a left column and a pixel which is above and left of the block.

The Luma type may include the four modes as described above with regard to the chroma type. However, each mode may additionally include dividing a 16×16 macro block into 16 4×4 sub-blocks, each sub-block is then independently predicted. The control signal 360 may include a parameter indicating prediction using a 16×16 macro block or 4×4 sub-blocks. The Luma type may include may also include additional modes that fill each block directionally (e.g., diagonally). For example, one additional mode may include filling each block diagonally from a vertical right perspective.

Inter-frame prediction may include decoding video frames based on prior video frames up to a last key frame. The key frames may include a previous video frame, an alternate reference frame and a golden reference frame. The previous video frame may be the last fully decoded video frame which may be updated with every shown video frame. The alternate reference frame and the golden reference frame may be a fully decoded video frame stored in a decoded video frame buffer. The golden reference frame may additionally be a video frame used for error recovery.

In real time video applications (e.g., video conferencing), Inter-frame prediction may include motion detection. The motion detection may include setting a size of a motion search window or partition. For example the windows may be set as (in pixel×pixel or block×block) 16×16, 16×8, 8×16, 8×8 or 4×4. The size of the motion search window may affect the speed at which video encoding is performed. For example, motion search windows sized at 16×16 may result in a faster encoding than a motion search windows sized at 4×4, because fewer windows are searched.

The prediction block 330 may be configured to perform one or more of intra-frame prediction or inter-frame prediction. The prediction block 330 may be configured to receive a control signal 360 from the controller 120. The control signal 360 may include a parameter indicating the type and/or modes to use. The prediction block 330 may be configured to turn on/off sub pixel motion. The prediction block 330 may be configured to set a sub pixel motion type (e.g., ½ or ¼).

The prediction block 330 may be configured to receive a control signal 360 from the controller 120. The control signal 360 may include a parameter indicating size of a motion search window, search modes, sub pixel motion on/off and type, thresholds for vertical and horizontal prediction.

The video encoder 125 described above with regard to FIG. 3 includes the blocks shown. However, example embodiments are not limited thereto. Additional blocks may be added based on the different video encoding configurations and/or techniques used. Each additional block may or may not include settings (and associated parameters) that may be set based on the methods described herein. Further, each of the blocks shown in the video encoder 125 described above with regard to FIG. 3 may be optional blocks based on the different video encoding configurations and/or techniques used.

According to example embodiments, two tables may be defined. Each table may be stored in, for example, the at least one memory 110. First, the video encoder system 100 includes an associated table (e.g., the data table 400 illustrated in FIG. 4A) which contains different video encoding schemes and corresponding estimated video processing times. Each scheme includes one configuration of the video encoder. For example, each video encoding scheme may include settings associated with the size of a motion search window, rate distortion, sub pixel motion, loop filter options, motion search modes, thresholds for vertical and horizontal prediction, thresholds for multiple motion vectors, and the like. Each scheme includes an estimated video processing time for which the video encoder expects video encoding to be finished (e.g., an average processing time on an electronic device) based on a combination of these settings.

The video encoder system 100 also maintains in, for example, the at least one memory 110 a table which records system resource utilization (e.g., encoding process time) history (e.g., the data table 450 illustrated in FIG. 4B). By comparing the system resource utilization and video encoding time in the first table, the controller 120 may choose (by selecting a scheme from the first table) which scheme to be used in processing a subsequent video frame and if more or less system resource should be allocated to the video encoder system 100.

FIG. 4A illustrates a data table according to at least one example embodiment. As shown in FIG. 4A, the data table 400 includes four columns. Although four columns are shown, example embodiments are not limited thereto. The four columns include a configuration index column 405, an encoding scheme column 410, an estimated processing time column 415, and a sample data column 420.

The configuration index column 405 includes a configuration index number for each video encoding scheme. The configuration index number is used by the controller 120 to cycle through data table 400 when selecting a video encoding scheme (see FIG. 5 below). The records in data table 400 may be sorted. For example, records in data table 400 may be sorted by sorting on the configuration index column 405 such that the configuration index number is ordered from lowest to highest or highest to lowest.

The encoding scheme column 410 includes rows having data associated with each unique video encoding scheme. As discussed above, the video encoding scheme may have input parameters and settings for each of the blocks discussed above with regard to FIG. 1A. For example, the video encoding scheme may have input parameters and settings for the size of a motion search window, rate distortion, sub pixel motion, loop filter options, motion search modes, thresholds for vertical and horizontal prediction, thresholds for multiple motion vectors, and the like. According to example embodiments, the video encoding scheme may be developed such that a frame rate associated the video encoder 125 is substantially constant while the video encoding scheme varies a quality (e.g., resolution) of the encoded video (e.g., the compressed video bits 10).

The estimated processing time column 415 includes rows having data associated with an estimation of how much time a typical device will take to encode a video using the associated video encoding scheme. The estimated time may be based on controlled environment testing (e.g., computer simulations) and/or real environment calculations (e.g., calculations based on stored data of actual system encoding). The controlled environment testing and/or real environment calculations may be based on a similar system as an end use system. For example, the controlled environment testing and/or real environment calculations may be based on a system having a similar processor, memory, operating system and the likes as the end use system. The estimated processing time may be sorted from lowest to highest or highest to lowest. The estimated processing time may correspond to the configuration index number. For example, the lowest configuration index number may correspond to the fastest estimated processing time.

For example, the video encoding scheme may be a ranked video encoding scheme having an encoding level. The ranking being based on the estimated processing time. For example, the encoding level may be a complexity level where adding complexity to the video encoding scheme may increase the time (e.g., elapsed time) for the video encoder 125 to encode the video frame.

The sample data column 420 includes rows having data associated with real environment video frame encoding using the video encoding scheme on, for example, similar devices and/or the device including the video encoder system 100. For example, the sample data may be an average (or some other mathematical summary) of data stored based on a real environment measurement of video frame encoding using the associated video encoding scheme. For example, the sample data may be an average of data stored in the processing time column 465 of data table 450 described below FIG. 4B illustrates a data table according to at least one example embodiment. As shown in FIG. 4B, the data table 450 includes three columns. Although three columns are shown, example embodiments are not limited thereto. The three columns include a key column 455, a configuration index column 460, and a processing time column 465.

The key column 455 includes data uniquely identifying each row stored in the data table. For example, the key may be an integer number that is unique for each record (or row) in the data table.

The configuration index column 460 includes the configuration index number for each video encoding scheme. The configuration index number shown in FIG. 4B may be used to link data associated with the data table 400 described in FIG. 4A.

The processing time column 465 includes rows having data associated with a real environment measurement (e.g., elapsed time) of video frame encoding using the associated video encoding scheme. The elapsed time may be stored in a data table (e.g., data table 450 described in FIG. 4B) in conjunction with the processing of the method described below in FIG. 5.

Example embodiments provide a method and apparatus for detecting system resource utilization (e.g., at least one processor 105 usage) and adjusting system resource utilization in a subsequent video frame. Example embodiments may pre-define certain configurations for the video encoder (e.g., stored in a data table 400 described above), and for each video encoder configuration, the system resource utilization may be estimated (e.g., by estimating an elapsed time for encoding in each configuration). By comparing the estimated system resource utilization and real time system resource utilization (e.g., encoding process time), a delta in system resource utilization can be detected. As a result, video encoder configuration may be changed accordingly to meet real time requirements.

Figure 5:
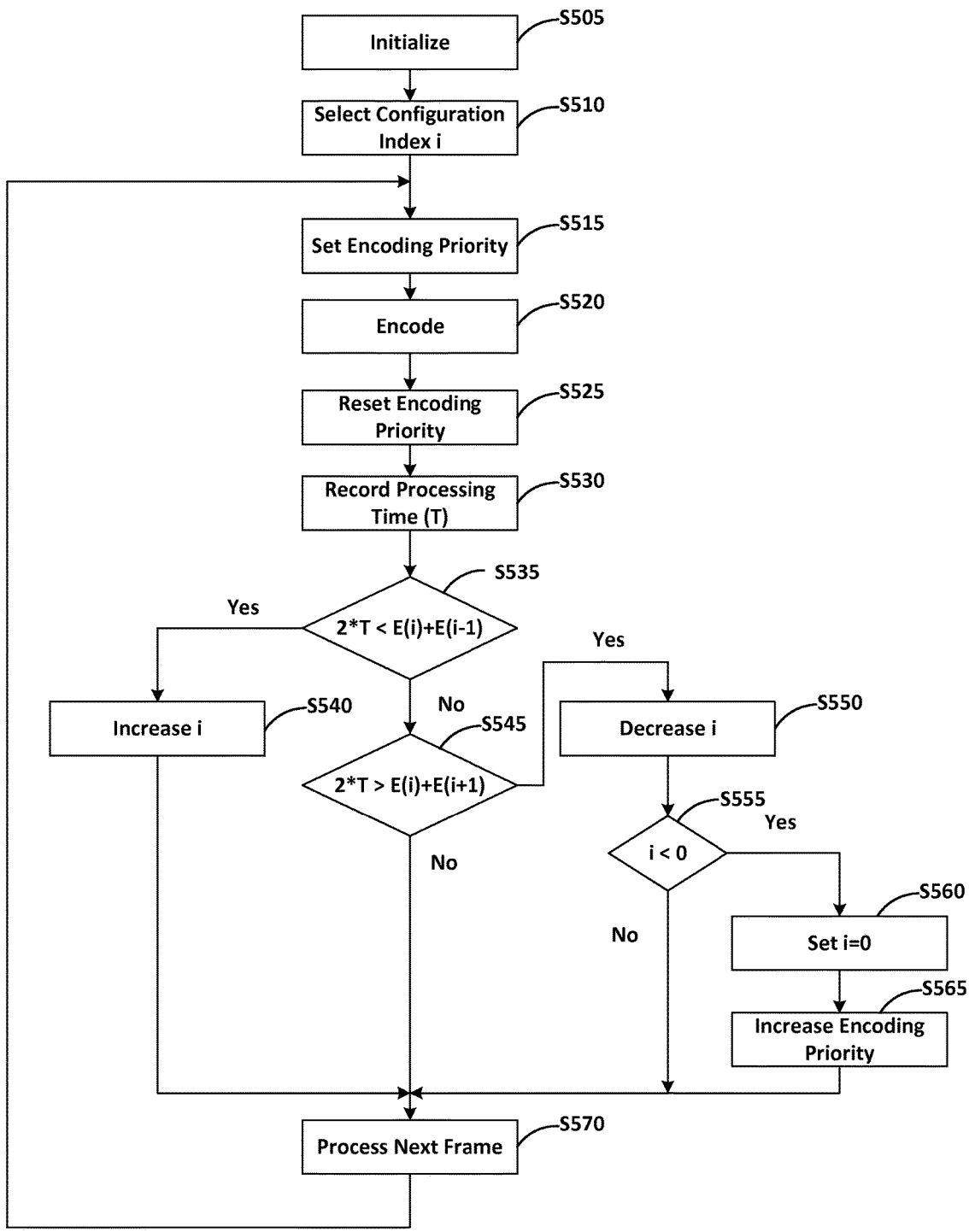
FIG. 5 illustrates a method for encoding a video frame according to at least one example embodiment.

FIG. 5 illustrates a method for encoding a video frame according to at least one example embodiment. The method steps described with regard to FIG. 5 may be executed as software code stored in a memory (e.g., at least one memory 110) associated with a video encoder system (e.g., as shown in FIG. 1A) and executed by at least one processor (e.g., processor 105) associated with the video encoder system. For example, the processor may be associated with one or more of the blocks (e.g., the transform block 305 or the quantization block 315) or the controller 120. However, alternative embodiments are contemplated such as a video encoder embodied as a special purpose processor.

For example, the method steps may be performed by an application-specific integrated circuit, or ASIC. For example, the ASIC may be configured as one or more of the blocks (e.g., the transform block 305 or the quantization block 310) and/or the controller 120. Although the steps described below are described as being executed by a processor, the steps are not necessarily executed by a same processor. In other words, at least one processor may execute the steps described below with regard to FIG. 5.

As shown in FIG. 5, in step S505 a processor initializes a video encoder to encode at least one video frame. For example, the processor may receive a video stream input 5, break the stream into a plurality of video frames and select the first video frame. The processor may also set initial configurations. For example, the processor may organize the data table 400 described above with regard to FIG. 4A as described below in FIG. 4. The processor may determine and set any parameters associated with video encoding. For example, the processor may determine and set frame rate.

In step S510 the processor selects a configuration index number (i). As discussed above, the configuration index number may set the video encoding scheme. For example, selecting the configuration index number may select the video encoding scheme from the data table 400 described above with regard to FIG. 4A. The processor may select the configuration index number based on, for example, an initial target processing target, a default index (e.g., 0, 5, and 10), a fastest processing time, a target encoding quality, and the like.

In step S515 the processor sets an encoding priority. The encoding priority may be, for example, a default priority, a priority set as part of a configuration file, and the like. The priority may be configured dynamically. For example, the encoding priority may be altered during the processing of a previous video frame (see step S565 below).

In step S520 the processor encodes a video frame. For example, the processor may generate the compressed video bits 10 as described above with regard to block 135 of FIG. 1A. For example, the processor may transform and quantize the video frame. In addition, as part of an encoding process, the processor may inverse transform, inverse quantize, filter, and perform prediction based on the video frame. The processor may utilize a video encoding scheme to encode the video frame. For example, the video encoding scheme may be selected from a data table (e.g., the data table 400 described with regard to FIG. 4A) selected based on the configuration index number.

In step S525 the processor resets the encoding priority. For example, the processor may reset the encoding priority to a default value. For example, the default value may be a value that results in the system resources not being allocated to the encoder because encoding is complete. For example, the encoding priority may be low in order to allow other system processes to execute more timely.

In step S530 the processor records an processing time (T). For example, upon completion of the encoding (including the inverse transform, inverse quantize, filter, and prediction), the processor may record an elapsed time. The elapsed time may be stored as a record in, for example, the processing time column 465 of the data table 450 described above with regard to FIG. 4B.

In step S535 the processor determines if $2*T<E(i)+E(i-1)$. $E(i)+E(i-1)$ being an estimated processing time algorithm. For example, the processor may read the value of processing time T (e.g., the most recent entry in the processing time column 465 of the data table 450 described above with regard to FIG. 4B) and multiply the value of T by two (2). The processor may also read the time (e.g., the estimated processing time in the estimated processing time column 415 of the data table 400 described above with regard to FIG. 4A) associated with configuration index number (i) and associated with configuration index number (i−1). The processor may then determine the result of $2*T<E(i)+E(i−1)$. If $2*T<E(i)+E(i−1)$, processing continues to step S540. If $2*T>E(i)+E(i−1)$, processing continues to step S545.

In step S540 the processor increases the configuration index number (i). For example, the processor adds one (1) to the value of configuration index number (i).

In step S545 the processor determines if $2*T>E(i)+E(i+1)$. $E(i)+E(i+1)$ being an estimated processing time algorithm. For example, the processor may read the value of processing time T (e.g., the most recent entry in the processing time column 465 of the data table 450 described above with regard to FIG. 4B) and multiply the value of T by two (2). The processor may also read the time (e.g., the estimated processing time in the estimated processing time column 415 of the data the data table 400 described above with regard to FIG. 4A) associated with configuration index number (i) and associated with configuration index number (i−1). The processor may then determine the result of $2*T>E(i)+E(i+1)$. If $2*T>E(i)+E(i+1)$, processing continues to step S550. If $2*T<E(i)+E(i+1)$, processing continues to step S570.

In step S550 the processor decreases the configuration index number (i). For example, the processor subtracts one (1) from the value of configuration index number (i). In step S555 the processor determines if i<0. For example, the processor may determine if the result of subtracting one (1) from the value of configuration index number (i) is less than 0. If i<0 processing continues to step S560. Otherwise, processing continues to step S570. In step S560 the processor sets i=0.

In step S565 the processor increases the encoding priority. As discussed above, the encoding priority may be a numeric value (e.g. a number between 1 and 10). The encoding priority may be a text value (e.g., low, medium, high). If the encoding priority is numeric, the processor may add one to the value of the encoding priority if a higher value of the encoding priority equates to a higher priority. If the encoding priority is numeric, the processor may subtract one from the value of the encoding priority if a lower value of the encoding priority equates to a higher priority. If the encoding priority is a text value, the processor may change the text associated with the encoding priority. For example, the text value may be changed from low to medium or medium to high.

In step S570 the processor initiates the processing of a subsequent video frame. As discussed above, a received video stream input 5 may be modified into a plurality of video frames. The video frames may be sequential. The processor may select the subsequent sequential video frame from the plurality of video frames for processing. The processor may then return processing to step S515.

Figure 6:
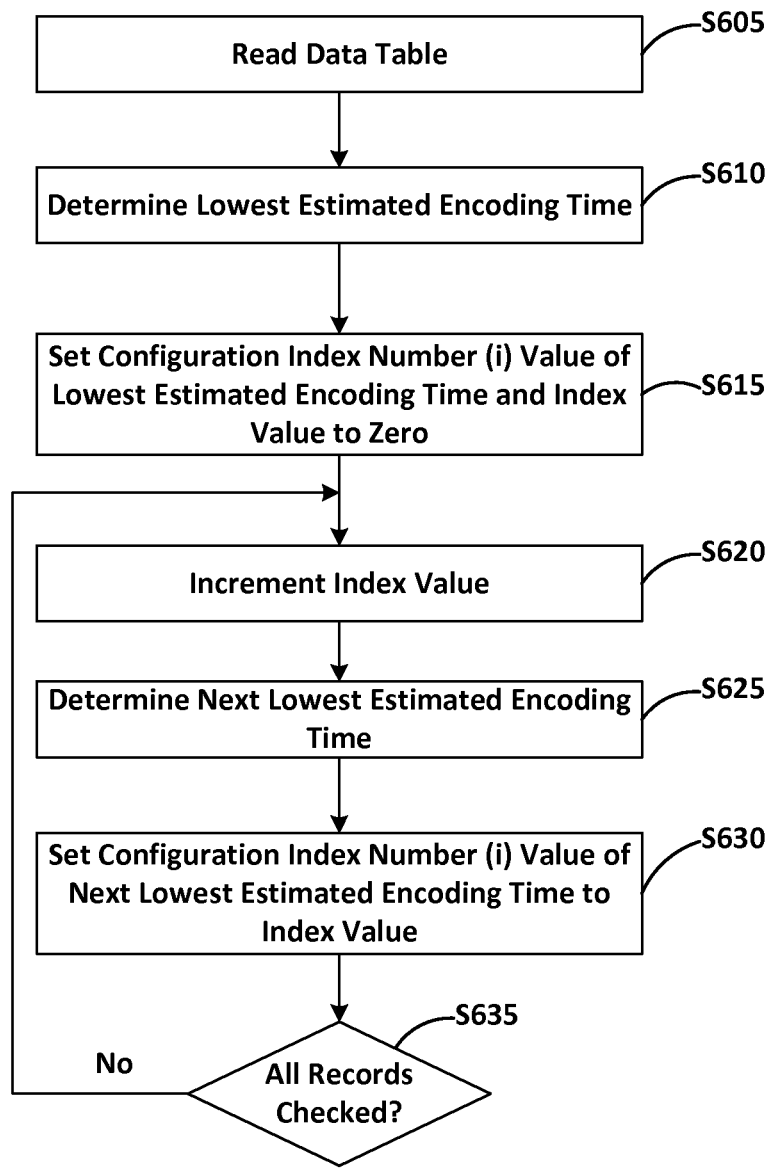
FIG. 6 illustrates a method for organizing a data table for use in encoding a video frame according to at least one example embodiment.

FIG. 6 illustrates a method for organizing a data table for use in encoding a video frame according to at least one example embodiment. The method steps described with regard to FIG. 6 may be executed as part of initializing (step S505) a video encoder to encode at least one video frame as described above with regard to FIG. 5. The method steps described with regard to FIG. 6 may be executed as software code stored in a memory (e.g., at least one memory 110) associated with a video encoder system (e.g., as shown in FIG. 1A) and executed by at least one processor (e.g., processor 105) associated with the video encoder system. For example, the processor may be associated with one or more of the blocks (e.g., the transform block 305 or the quantization block 310) and/or the controller 120. However, alternative embodiments are contemplated such as a special purpose processor.

For example, the method steps may be performed by an application-specific integrated circuit, or ASIC. For example, the ASIC may be configured as one or more of the blocks (e.g., the transform block 125 or the quantization block 310) and/or the controller 120. Although the steps described below are described as being executed by a processor, the steps are not necessarily executed by a same processor. In other words, at least one processor may execute the steps described below with regard to FIG. 6.

As shown in FIG. 6, in step S605 a processor reads a data table. For example, the processor may read the data table 400 described above with regard to FIG. 4A. In step S610 the processor determines the lowest estimated processing time. For example, the at least one processor 105 may sort the data table 400 described above with regard to FIG. 4A in descending order based on the estimated processing time data column 415. The first record set (e.g., index zero) includes the lowest estimated processing time. Alternatively, the processor may sort the data table 400 described above with regard to FIG. 4A in ascending order based on the estimated processing time data column 415. The last record set includes the lowest estimated processing time.

In step S615 the processor sets the configuration index number value of the lowest estimated processing time to zero and an index value to zero. The processor may set the first record set configuration index number value to zero. In step S620 the processor increments the index value. In step S625 the processor determines a next lowest estimated processing time. For example, if the data table 400 described above with regard to FIG. 4A was sorted in descending order, the second record set includes the next lowest estimated processing time (and so on and so forth until the last record set includes the highest estimated processing time).

In step S630 the processor sets the configuration index number value of the next lowest estimated processing time to the index value. The processor may set the current record set configuration index number value to the current value of the index value.

In step S635 the processor determines if all records in the data table have been checked. For example, if the current index value equals the number of rows minus one, all of the records in the data table may have been checked. If all records in the data table have been checked, processing ends. Otherwise, processing returns to step S620.

Figure 7:
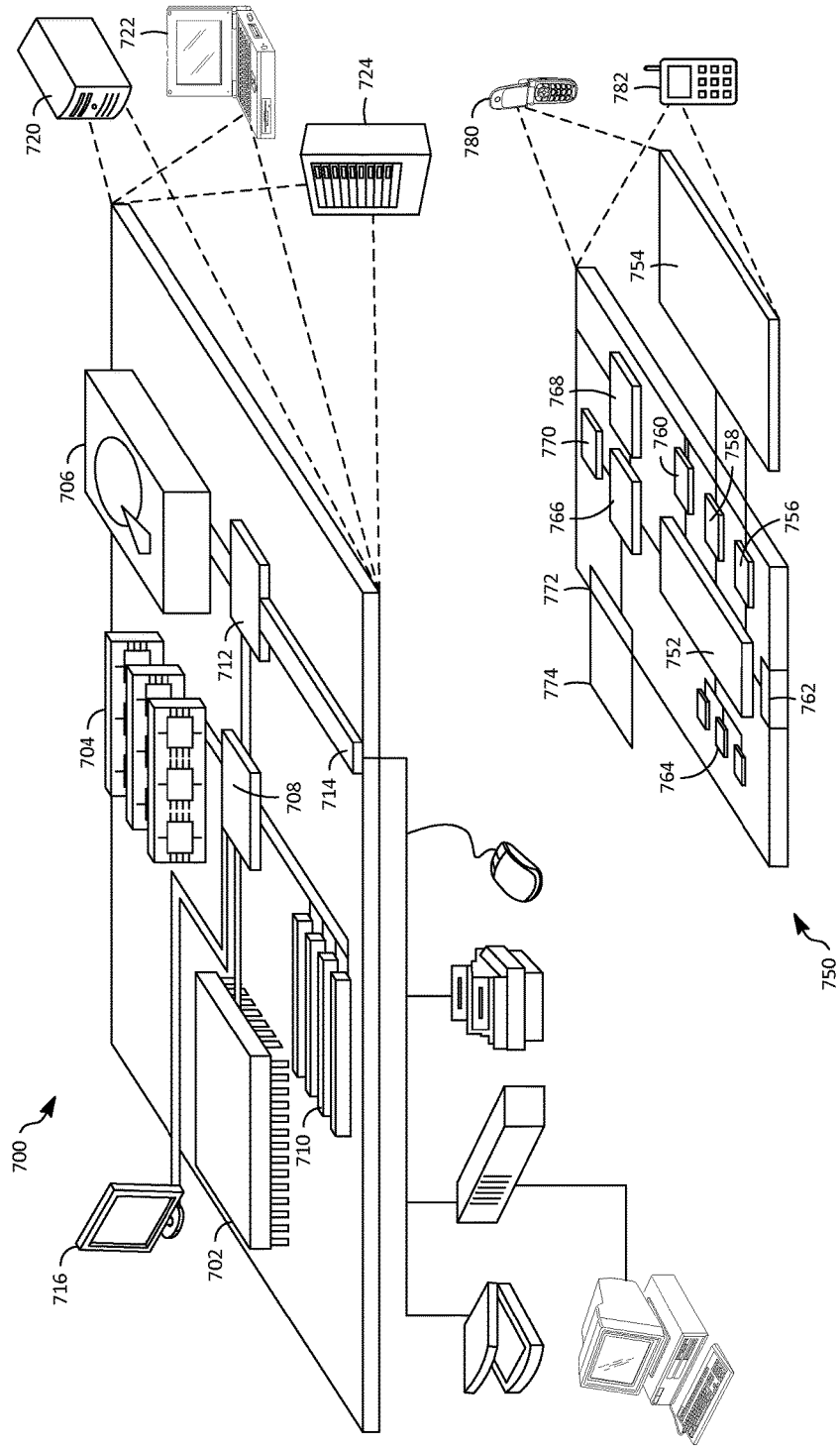
FIG. 7 illustrates a block diagram of a system according to at least one example embodiment.

FIG. 7 illustrates a block diagram of a system in accordance with an example embodiment. FIG. 7 shows an example of a generic computer device 700 and a generic mobile computer device 750, which may be used with the techniques described herein. Computing device 700 may represent various forms of digital computers, such as laptops, desktops, workstations, personal digital assistants, servers, blade servers, mainframes, and other appropriate computers. Computing device 700 may include the features and elements described above with regard to FIG. 1A. For example, computing device 700 may include and/or represent at least system 100.

Computing device 750 may represent various forms of mobile devices, such as personal digital assistants, cellular telephones, smart phones, and other similar computing devices. Computing device 750 may include the features and elements described above with regard to FIGS. 1 and 3. The components shown here, their connections and relationships, and their functions, are meant to be exemplary only, and are not meant to limit implementations of example embodiments described and/or claimed in this document. For example, computing device 750 may include and/or represent at least system 100.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700 (e.g., process instructions associated with the method described above with regard to FIG. 2), including instructions stored in the memory 704 or on the storage device 706 to display graphical information for a graphical user interface (GUI) on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system, etc.).

The memory 704 stores information within the computing device 700. In one implementation, the memory 704 includes a volatile memory unit or units. In another implementation, the memory 704 includes a non-volatile memory unit or units. The memory 704 may also be another form of computer-readable medium, such as a magnetic or optical disk.

The storage device 706 is configured to provide mass storage for the computing device 700. In one implementation, the storage device 706 may be or may contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain (e.g., store) instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, computing device 700 may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output (I/O) device such as a display 754, a communication interface 766, and a transceiver 768, among other components. The device 750 may also be provided with a storage device, such as a micro-drive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750 (e.g., process instructions associated with the method described above with regard to FIGS. 5 and 6), including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert the spoken information to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, computing device 750 may be implemented as a cellular telephone 780. Computing device 750 may also be implemented as part of a smart phone 782, personal digital assistant, or other similar mobile device Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method for encoding a video stream, the method comprising:
   determining, using at least one of a historical video encoding data and a simulated encoding data generated based on at least one measurement of a time of a video encoding, a first estimated time period for encoding a frame of the video stream based on a first algorithm configured to estimate a processing time for encoding the frame, the first algorithm being based on a first input control signal corresponding to at least one variable setting of an encoder processing block, the at least one variable setting having a first predetermined processing time used as a variable in the first algorithm;
   determining, using at least one of the historical video encoding data and the simulated encoding data, a second estimated time period for encoding the frame based on a second algorithm configured to estimate a processing time for encoding the frame, the second algorithm being based on a second input control signal corresponding to the at least one variable setting of the encoder processing block, the at least one variable setting having a second predetermined processing time used as a variable in the second algorithm;
   measuring an elapsed time period for encoding the frame independent of other frames of the video stream;
   comparing the elapsed time period for encoding the frame to at least one of the first estimated time period and the second estimated time period; and
   changing an encoding scheme for encoding a subsequent frame of the video stream if the encoding time of the frame is one of less than the first estimated time period and greater than the second estimated time period.

2. The method of claim 1, wherein
   the first algorithm is a sum of a first estimated processing time read from a data table and a second estimated processing time read from the data table;
   the first estimated processing time being an estimated time for encoding the frame;
   the second estimated processing time being an estimated time for an encoding scheme having a faster estimated time than the first estimated time; and
   changing the encoding scheme for the subsequent frame includes selecting an encoding scheme having an estimated processing time slower than the first estimated time if the encoding time of the frame is less than the first time period.

3. The method of claim 1, wherein
   the second algorithm is a sum of a first estimated processing time read from a data table and a second estimated processing time read from the data table;
   the first estimated processing time being an estimated time for encoding the frame;
   the second estimated processing time being an estimated time for an encoding scheme having a slower estimated time than the first estimated time; and
   changing the encoding scheme for the subsequent frame includes selecting an encoding scheme having an estimated processing time faster than the first estimated time if the encoding time of the frame is greater than the second time period.

4. The method of claim 1, wherein
   the second algorithm is a sum of a first estimated processing time read from a data table and a second estimated processing time read from the data table;
   the first estimated processing time being an estimated time for encoding the frame;
   the second estimated processing time being for an encoding scheme having a slower estimated time than the first estimated processing time; and
   changing the encoding scheme for the subsequent frame includes increasing an encoding priority for the subsequent frame if the first estimated time is a fastest estimated processing time associated with the data table and if the encoding time of the frame is greater than the second time period.

5. The method of claim 1, wherein each video encoding scheme includes an associated estimated elapsed video processing time for which a frame encoding is expected to be finished.

6. The method of claim 1, further comprising:
   generating control signals based on the encoding scheme, the control signals corresponding to settings associated with at least one of a size of a motion search window, a rate distortion, a sub pixel motion, loop filter options, motion search modes, thresholds for vertical and horizontal prediction, and thresholds for multiple motion vectors, the control signals corresponding to input control signals for a video encoder.

7. The method of claim 1, wherein the at least one measurement of the time of the video encoding is an encoding that uses a corresponding video encoding scheme and is encoded by a device having similar capabilities as a device encoding the video stream.

8. A method for encoding a video stream, the method comprising:
   generating a data table including a plurality of video encoding schemes and associated estimated times for encoding a frame using each of the video encoding schemes, the estimated times being calculated using at least one of a historical video encoding data and a simulated encoding data generated based on at least one measurement of a time of a video encoding;

indexing the data table such that an index value of zero includes an estimated processing time for encoding a frame is associated with a lowest time value and each subsequent index value is associated with a subsequent lowest time value;

selecting a first index value;

encoding a first frame using a video encoding scheme selected from the data table using the first index value;

measuring an elapsed time period for encoding a first frame independent of other frames of the video stream;

determining a first estimated time period for encoding the first frame based on a first algorithm configured to estimate a processing time for encoding the frame, the first algorithm being based on a first input control signal corresponding to at least one variable setting of an encoder processing block, the at least one variable setting having a first predetermined processing time used as a variable in the first algorithm;

determining a second estimated time period for encoding the frame based on a second algorithm configured to estimate a processing time for encoding the frame, the second algorithm being based on a second input control signal corresponding to the at least one variable setting of the encoder processing block, the at least one variable setting having a second predetermined processing time used as a variable in the second algorithm;

comparing an encoding time of the first frame to at least one of the first estimated time period and the second estimated time period; and selecting a second index value for use in encoding a second frame if the encoding time of the frame is one of less than the first time period and greater than the second time period.

9. The method of claim 8, wherein the first algorithm is a sum of a first estimated processing time read from a data table and a second estimated processing time read from the data table;

the first estimated processing time being an estimated time for encoding the first frame;

the second estimated processing time being an estimated time for an encoding scheme having a faster estimated time than the first estimated time; and selecting the second index value for use in encoding the second frame includes incrementing the index value by one if the encoding time of the frame is less than the first time period.

10. The method of claim 8, wherein the second algorithm is a sum of a first estimated processing time read from a data table and a second estimated processing time read from the data table;

the first estimated processing time being an estimated time for encoding the first frame;

the second estimated processing time being an estimated time for an encoding scheme having a slower estimated time than the first estimated time; and selecting the second index value for use in encoding the second frame includes decrementing the index value by one if the encoding time of the frame is greater than the second time period.

11. The method of claim 8, wherein the second algorithm is a sum of a first estimated processing time read from a data table and a second estimated processing time read from the data table;

the first estimated processing time being an estimated time for encoding the first frame;

the second estimated processing time being an estimated time for an encoding scheme having a slower estimated time than the first estimated time;

selecting the second index value for use in encoding the second frame includes decrementing the index value by one;

determining if the second index value is less than zero;

setting the second index value to zero if the second index value is less than zero; and increasing an encoding priority for the second frame if the second index value is less than zero.

12. The method of claim 8, wherein each video encoding scheme includes an associated estimated elapsed video processing time for which a frame encoding is expected to be finished.

13. The method of claim 8, further comprising:

generating control signals based on the encoding scheme, the control signals corresponding to settings associated with at least one of a size of a motion search window, a rate distortion, a sub pixel motion, loop filter options, motion search modes, thresholds for vertical and horizontal prediction, and thresholds for multiple motion vectors, the control signals corresponding to input control signals for a video encoder.

14. The method of claim 8, wherein the at least one measurement of the time of the video encoding is an encoding that uses a corresponding video encoding scheme and is encoded by a device having similar capabilities as a device encoding the video stream.

15. An encoding system comprising:

a processor;

a memory configured to store a data table, the data table including a plurality of video encoding schemes and corresponding estimated processing times for encoding a frame using the video encoding schemes, each of the estimated processing times being calculated using an algorithm based on an input control signal corresponding to at least one variable setting of an encoder processing block, the at least one variable setting having a predetermined processing time used as a variable in the algorithm, the predetermined processing time being calculated using at least one of a historical video encoding data and a simulated encoding data generated based on at least one measurement of a time of a video encoding;

a controller configured to:

measure an elapsed time period for encoding a current frame of a video stream independent of encoding a previous frame of the video stream and independent of encoding a subsequent frame of the video stream;

select one of the video encoding schemes for encoding the subsequent frame based on at least two estimated processing time periods for encoding the current-frame and the elapsed time period for encoding the current frame; and a video encoder configured to encode the subsequent frame using the selected video encoding scheme.

16. The encoding system of claim 15, wherein the controller is configured to, index the data table such that an index value of zero includes an estimated processing time for encoding a frame is associated with a lowest time value and each subsequent index value is associated with a subsequent lowest time value;

select a first index value;

encode the current frame using a video encoding scheme selected from the data table using the first index value;

determine a first time period for encoding the current frame based on a first algorithm configured to estimate a processing time for encoding the current frame and the estimated processing time period for encoding the current frame;

determine a second time period for encoding the current frame based on a second algorithm configured to estimate a processing time for encoding the frame;

compare the elapsed time period for encoding the current frame to the first time period and the second time period; and select a second index value for use in encoding the subsequent frame if the encoding time of the frame is one of less than the first time period and greater than the second time period.

17. The encoding system of claim 16, wherein the first algorithm is a sum of a first estimated processing time read from a data table and a second estimated processing time read from the data table;

the first estimated processing time being an estimated time for encoding the current frame;

the second estimated processing time being for an encoding scheme having a faster estimated time than the first estimated time; and selecting the second index value for use in encoding the subsequent frame includes incrementing the index value by one if the encoding time of the frame is less than the first time period.

18. The encoding system of claim 16, wherein the second algorithm is a sum of a first estimated processing time read from a data table and a second estimated processing time read from the data table;

the first estimated processing time being an estimated time for encoding the current frame;

the second estimated processing time being for an encoding scheme having a slower estimated time than the first estimated time; and selecting the second index value for use in encoding the subsequent frame includes decrementing the index value by one if the encoding time of the frame is greater than the second time period.

19. The encoding system of claim 16, wherein the second algorithm is a sum of a first estimated processing time read from a data table and a second estimated processing time read from the data table;

the first estimated processing time being an estimated time for encoding the current frame;

the second estimated processing time being for an encoding scheme having a slower estimated time than the first estimated time;

selecting the second index value for use in encoding the subsequent frame includes decrementing the index value by one;

determining if the second index value is less than zero;

setting the second index value to zero if the second index value is less than zero; and increasing an encoding priority for the subsequent frame if the second index value is less than zero.

20. The encoding system of claim 15, wherein each video encoding scheme includes an associated estimated elapsed video processing time for which a frame encoding is expected to be finished.

21. The encoding system of claim 15, wherein the controller is configured to generate control signals based on the encoding scheme, the control signals corresponding to settings associated with at least one of a size of a motion search window, a rate distortion, a sub pixel motion, loop filter options, motion search modes, thresholds for vertical and horizontal prediction, and thresholds for multiple motion vectors, the control signals corresponding to input control signals for the video encoder.

22. The encoding system of claim 15, wherein the video encoder is configured to receive control signals based on the encoding scheme, the control signals corresponding to settings associated with at least one of a size of a motion search window, a rate distortion, a sub pixel motion, loop filter options, motion search modes, thresholds for vertical and horizontal prediction, and thresholds for multiple motion vectors.

23. The encoding system of claim 15, wherein the at least one measurement of the time of the video encoding is an encoding that uses a corresponding video encoding scheme and is encoded by a device having similar capabilities as the encoding system.

* * * * *